United States Patent [19]

Myers

[11] Patent Number: 4,685,361
[45] Date of Patent: Aug. 11, 1987

[54] MACHINE TOOL

[75] Inventor: Carl J. Myers, Mentor, Ohio

[73] Assignee: The Warner & Swasey Company, Cleveland, Ohio

[21] Appl. No.: 199,024

[22] Filed: Oct. 20, 1980

[51] Int. Cl.[4] .............................................. B23B 25/04
[52] U.S. Cl. ...................................... 82/2 R; 74/608;
82/32; 82/34 R; 198/860.3; 210/400
[58] Field of Search ................... 82/DIG. 2, 34 R, 32,
82/36 A; 29/DIG. 50, 63, 73, 79, 94, 99, 101,
102; 408/67; 409/134, 137; 198/342, 716, 361,
698, 699; 74/608, 609; 210/526, 168, 232, 400;
51/268-274; 49/485

[56]  References Cited
U.S. PATENT DOCUMENTS

| | | | |
|---|---|---|---|
| 1,556,461 | 10/1925 | Thill | 49/485 |
| 1,912,622 | 6/1933 | Cove | 82/34 R |
| 1,923,781 | 8/1933 | Flanders | 82/34 R |
| 1,957,667 | 5/1934 | Ritter | 82/32 |
| 2,220,425 | 11/1940 | Potter | 82/32 |
| 2,714,926 | 8/1955 | Nichta | 74/608 |
| 2,759,606 | 8/1956 | Nippert | 210/400 |
| 2,867,064 | 1/1959 | Hermansson | 51/279 |
| 3,837,245 | 9/1974 | Schuler et al. | 82/32 |
| 4,006,518 | 2/1977 | Rudolph et al. | 82/36 A |
| 4,077,161 | 3/1978 | Wyle et al. | 51/268 |
| 4,137,169 | 1/1979 | El-Hwdi | 210/400 |
| 4,234,074 | 11/1980 | Martin | 198/861 |

FOREIGN PATENT DOCUMENTS

| | | | |
|---|---|---|---|
| 2613160 | 10/1977 | Fed. Rep. of Germany | 51/268 |
| 1538789 | 1/1979 | United Kingdom | 82/34 R |
| 2040204 | 8/1980 | United Kingdom | 82/32 |

OTHER PUBLICATIONS

Tooling and Production p. 37 advertisement, Jan. 1980.
Automatic Machining Magazine Sep. 1978 p. 28 Advertisement Showing Machine Enclosure.
Automatic Machining Magazine Mar. 1978 p. 15 Advertisement Showing Machine Enclosure.
Giddings & Lewis publication.

Primary Examiner—Nicholas P. Godici
Assistant Examiner—Jerry Kearns
Attorney, Agent, or Firm—Raymond J. Eifler; Calvin G. Covell

[57] ABSTRACT

An improved machine tool includes a chip conveyor assembly which includes a conveyor and a coolant tank. The chip conveyor assembly is movable between a closed or operating position and an open or exposed position. In the closed position, the chip conveyor assembly is disposed directly beneath a work area so that chips fall onto the conveyor. The chips are transported through an opening at one end of the machine tool to a discharge area where the chips are deposited in a suitable receptacle. To facilitate maintenance of the chip conveyor assembly, the entire chip conveyor assembly is movable through an opening in the front of the machine tool to an open position in which the components of the conveyor are accessible.

4 Claims, 5 Drawing Figures

MACHINE TOOL

The present invention relates to a machine tool and more particularly to a machine tool having a chip conveyor assembly to transport pieces of material cut from a workpiece.

Many known machine tools have been provided with pans for receiving chips cut from a workpiece in a work area. These pans have been mounted in such a manner as to enable them to be pulled out of the machine and emptied. Machine tools having pans for receiving chips or turnings are disclosed in U.S. Pat. Nos. 3,124,985 and 3,785,227.

Other known machine tools have been provided with chip conveyor assemblies which transport chips from a location beneath a work area to a discharge area where the chips are deposited in a suitable receptacle. One of these known machines has a chip conveyor assembly with a horizontal conveyor run disposed in a coolant tank and a sloping discharge conveyor section which extends upwardly.

When this known chip conveyor assembly is to be removed from the machine tool for maintenance purposes, the chip conveyor assembly is pulled out of one end of the machine tool along a path which extends generally parallel to the upper run of the conveyor and to the axis about which the machine tool rotates a workpiece. This requires floor space to be available at the end of the machine tool in order to enable the chip conveyor assembly to be withdrawn outwardly from one end of the machine tool. A known machine tool having a chip conveyor assembly with this construction is a turret lathe sold by The Warner & Swasey Company of Cleveland, Ohio under the trademark "SC-25".

SUMMARY OF THE PRESENT INVENTION

The present invention provides a machine tool having a chip conveyor assembly which is movable from an operating or closed position directly beneath a work area of the machine tool through an opening in the front of the machine tool. By moving the chip conveyor assembly through an opening in the front of the machine tool rather an end of the machine tool, the amount of floor space required at the end of the machine tool tends to be minimized and withdrawal of the chip conveyor assembly from the machine tool for maintenance purposes is facilitated. The floor space required by the chip conveyor assembly at the front of the machine tool is not wasted since this space must be provided for an operator of the machine.

The chip conveyor assembly includes a conveyor having an upper run which extends parallel to the spindle axis. The upper run is disposed directly beneath the spindle axis and a work area when the chip conveyor assembly is in the closed position. At this time, the chip conveyor assembly extends from one end of the machine tool to a discharge area. Upon movement of the chip conveyor assembly to the open position, at least a portion of the upper conveyor run is disposed in front of the machine tool.

In addition to the foregoing features, the illustrated preferred embodiment of the machine tool advantageously includes an elongated bed which is supported on three mounting pads from the floor. The chip conveyor assembly may include a coolant tank. The chip conveyor assembly is preferably a free standing, self-supporting unit. The coolant tank may be connected to the machine tool only by flexible hydraulic connections thru which coolant is pumped. The various hydraulic and/or electrical controls and drives are preferably supported on members extending from and attached to the machine tool bed. The various controls and drives are advantageously supported only by the machine tool bed.

The illustrated preferred embodiment of the machine tool is advantageously provided with a housing having two slidable doors on the front. One, a chuck access door, provides access to the machine tool workpiece support. The other door, during maching tool operation, is disposed toward the tailstock end of the machine. The chuck access door has observation windows formed therein thru which an operator can observe the turning workpiece. The other slidable door is latchable in a desired position toward the tailstock end of the machine tool. The chuck access door is slidable beneath the latchable door. Appropriate seals are provided between the two slidable doors. The chuck access door may include a baffle which extends therefrom generally toward the middle of a coolant pan or tank. When the machine tool is operating, the chuck access door is closed and the baffle will direct coolant and chips from the cutting area onto the chip conveyor disposed in the coolant tank.

Accordingly, it is an object of this invention to provide a new and improved machine tool and method in which a chip conveyor assembly is movable between a closed position disposed beneath a work area and an open position in which at least an upper run of a conveyor is disposed in front of the machine tool.

Another object of this invention is to provide a new and improved machine tool and method as set forth in the preceding object wherein the chip conveyor assembly has an outlet portion which extends through an opening at one end of the machine tool and wherein the chip conveyor assembly moves from the closed position to the open position through an opening in the front of the machine tool.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

General

Figure 1:
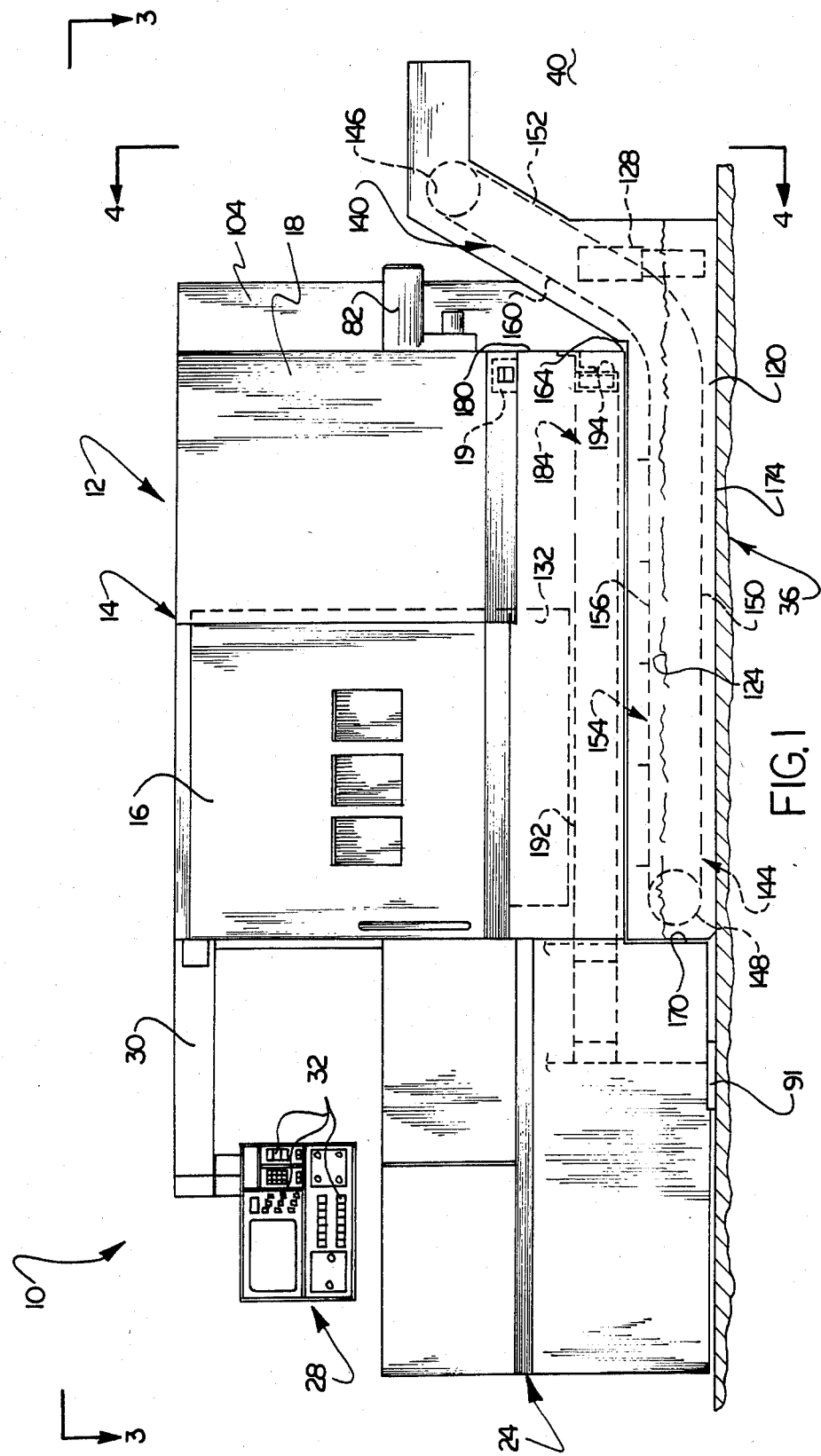
FIG. 1 is a front elevational view of a machine tool costructed in accordance with the present invention and illustrating the relationship between a chip conveyor assembly and a housing for the machine tool.

A machine tool 10 constructed in accordance with the present invention is illustrated in FIG. 1 and includes a housing 12 having a main section 14 which encloses a work area. The main section 14 of the housing 12 includes a door or slidable panel 16. The door 16 is movable from the closed position illustrated in FIG. 1 blocking access to the work area to an open position in which the door is telescoped beneath slidable panel 18. A suitable latching mechanism 19 is provided for latching slidable panel 18 in the position shown in FIG. 1. During normal workpiece loading and unloading panel 18 will be latched in position. When access to the tailstock end of the machine is desired, panel 18 can be unlatched and slid to the left over panel 16. When the door 16 is in the open position, an operator standing in front of the machine tool has access to the work area. In addition to the main section 14, the housing 12 includes a secondary section 24.

A control counsel or panel 28 is mounted on a pivotal arm 30 and has buttons 32 which are accessible to an operator standing in front of the machine tool 10. Although the control panel or counsel 28 has been shown in FIG. 1 offset to one side over the secondary section 24 of the housing, the arm 30 is pivotal to move the control panel closer to an operator standing in front of the door 16.

A chip conveyor assembly 36 is provided to transport chips or turnings to a discharge area 40 where the chips drop into a suitable receptacle (not shown). In addition to conducting chips to the discharge area 40, the chip conveyor assembly holds a supply of coolant which is pumped to the work area to cool the workpiece and the tools which operate on the workpiece.

Figure 2:
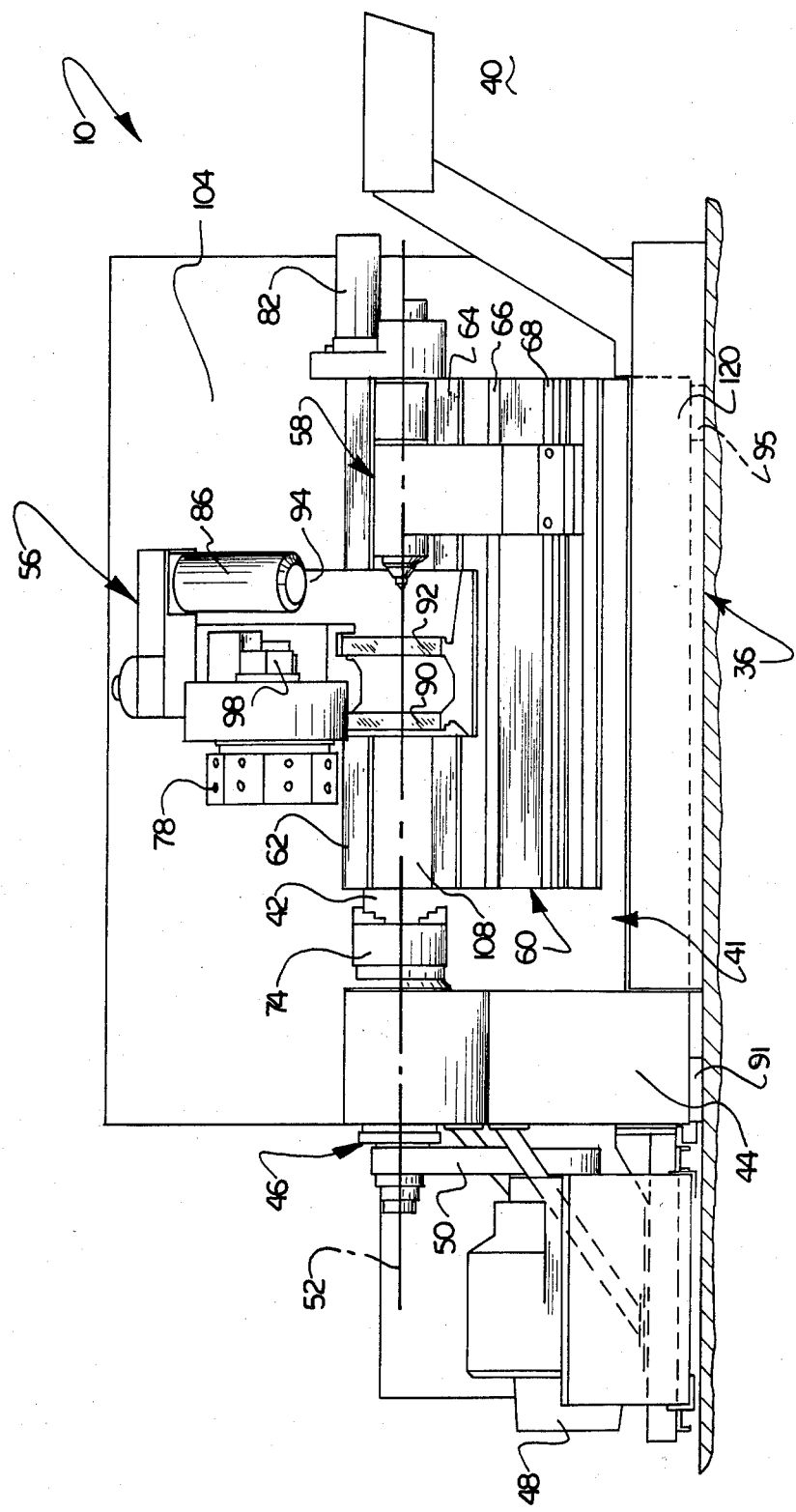
FIG. 2 is a front elevational view, generally similar to FIG. 1, illustrating the machine tool with the housing removed to disclose the relationship between various components of the machine tool and the chip conveyor assembly.

The construction of many of the operating components of the machine tool 10 is more clearly illustrated in FIG. 2 and includes a base 41, supported on three pads 91, 93, 95, having a longitudinally extending slant bed section 42 and a headstock section 44. The construction of the slant bed section 42 may be similar to the construction shown in a U.S. Pat. No. 3,124,985. However, the slant bed section 42 is preferably of the same construction as shown in a co-pending application Ser. No. 199,019, filed Oct. 20, 1980 by Richard D. Erickson entitled "Machine Tool" and assigned to the same assignee as the present application.

A spindle assembly 46 is mounted on the headstock section 44 and is driven by a motor 48 through a drive belt 50 to rotate a workpiece (not shown) about a central axis 52 of the spindle assembly. A turret assembly 56 and a tailstock assembly 58 are movably mounted on a wayblock 60. The wayblock 60 is connected to the slant bed section 42 of the base 41. The wayblock 60 is provided with ways 62, 64, 66, and 68. The ways 62, 64, 66 and 68 extend parallel to the spindle axis 52 and guide movement of the turret assembly 56 and tailstock assembly 58 relative to the spindle assembly.

The spindle assembly 46 has a chuck or jaws 74 which grip a workpiece and rotate it relative to the base 40 about the axis 52. The chuck 74 is secured to one end of a rotatable member which is disposed in and extends through the headstock section 44 and is driven by the drive belt 50 from the motor 48. As the workpiece is being rotated by the spindle assembly 46, suitable tools mounted on a rotatable and positionable turret 78 are effective to cut metal from the workpiece. During metal cutting, the turret 78 is held against rotation in a desired position by a suitable indexing mechanism.

A turret Z-axis servo drive motor 82 moves the turret assembly 56 along the Z-axis toward and away from the headstock section 44 of the base 41. In addition, an X-axis servo drive motor 86 is operable to move the turret 78 along the X-axis toward and away from the central axis 24 along ways 90 and 92 on a carriage 94. Servo drive motors 82 and 86 may be operated simultaneously at various speeds in selected directions to provide full two-axis movement of the turret 78. An indexing motor 98 is operable to rotate the turret 78, to selected angular positions, about an axis extending parallel to the central axis 24 of the spindle assembly 46 to position various tools mounted on the turret relative to a workpiece.

Suitable electrical controls are provided in a control cabinet 104 which is connected with the control counsel 28 (see FIG. 1). During operation of the machine tool 10, tools mounted on the turret 78 (FIG. 2) are effective to cut metal from a workpiece as it is being rotated by the spindle assembly 46. The chip conveyor assembly 36 is provided to conduct chips away from a cutting or work area 108. The work area 108 is disposed directly above the chip conveyor assembly 36 and the spindle axis 52 extends through the center of the work area 108. The chip conveyor assembly 36 conducts the chips or metal turnings which fall downwardly from the work area 108 to the discharge area 40 which is disposed at one end of the machine tool 10.

The construction of machine tool 10 is generally the same as is disclosed in a co-pending application Ser. No. 199,019, filed Oct. 20, 1980 by Richard D. Erickson entitled "Machine Tool" and assigned to the same assignee as the present application.

Chip Conveyor—Coolant

Coolant which is conducted under pressure to the work area 108 (FIG. 2) is collected in the chip conveyor assembly 36. Thus, the chip conveyor assembly 36 includes a longitudinally extending rectangular tank 120 (see FIGS. 1 and 4). The tank 120 has a central axis which is parallel to the spindle axis 52. The trough 120 extends throughout the length of the bed section 42 (FIG. 2) and abuts the headstock section 44. The trough 120 holds a body 124 of liquid coolant.

Figure 3:
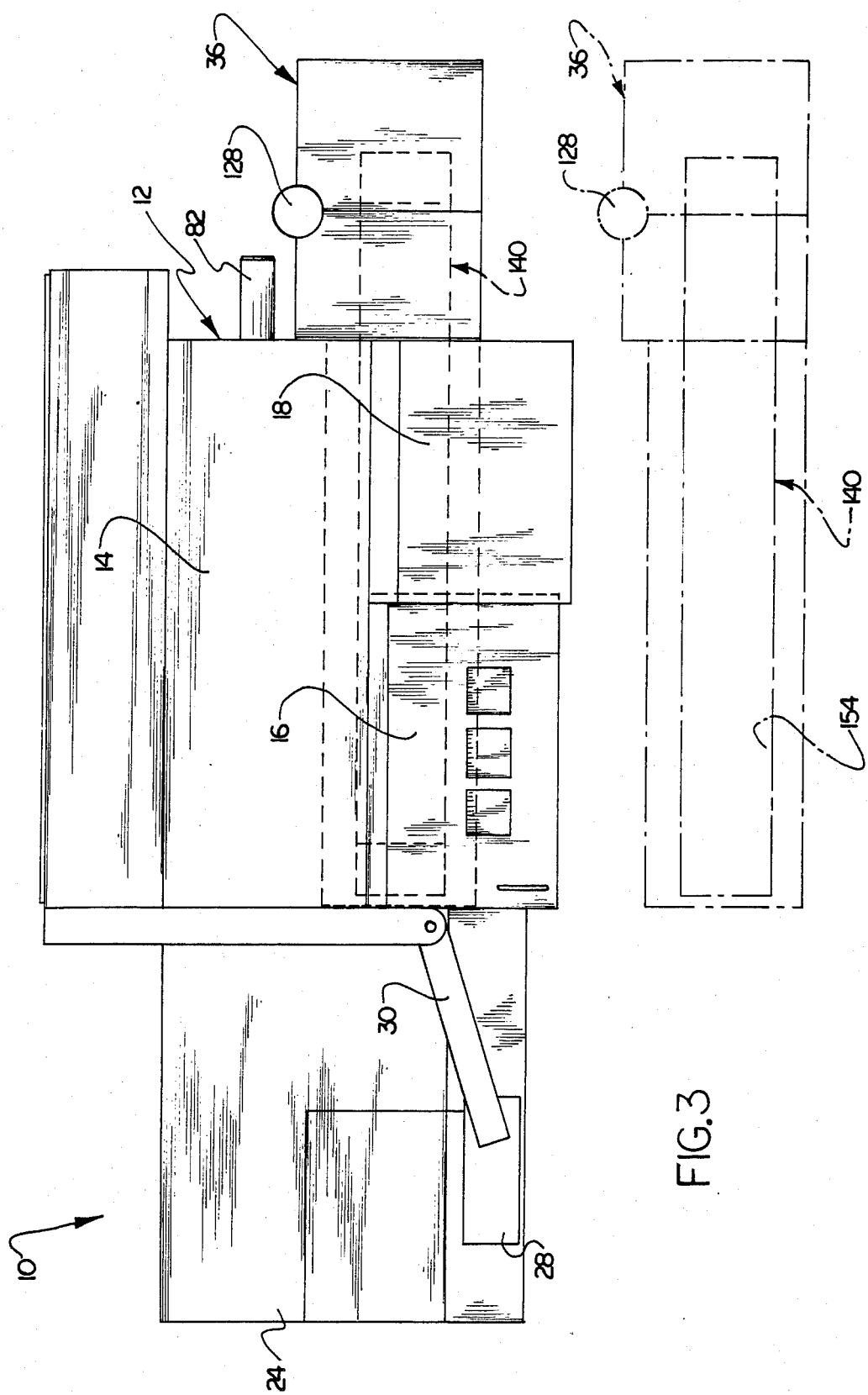
FIG. 3 is a top plan view, taken generally along the line 3—3 of FIG. 1, illustrating the chip conveyor assembly in a closed position disposed beneath a work area and, in phantom lines, in an open position disposed in front of the machine tool.

A coolant pump and motor assembly 128 (FIG. 4) is mounted on the trough 120 at a location past the end of the housing 12 (see FIGS. 1 and 3). The pump and motor assembly 128 is connected in fluid communication with the body 124 of coolant and with flexible conduits (not shown) which conduct the coolant to the work area where it flows over the workpiece and cutting tools. The coolant is circulated thru the chip conveyor assembly 36 and within the housing 12.

A deflector plate 132 (FIG. 4) is mounted on the movable door panel 16 to deflect a flow of coolant downwardly and inwardly toward the center line of the trough 120. The deflector plate 132 is mounted on the movable door 16 and moves with the door. When the door 16 is in the closed position (FIG. 1), the deflector plate 132 is disposed adjacent to the work area 108. However when the door 16 is slid along a guide track 136 (see FIG. 4), the deflector plate 132 moves with the door toward the right (as viewed in FIGS. 1 and 2). Since the door 16 telescopes inwardly of the latched slidable panel 18, the deflector plate 132 does not interfere with the latched panel 18 during movement of the door 16 between the open and closed positions.

When door 16 is in the closed position as shown in FIG. 1, the right end of door 16 extends beneath and past the left end of latched door 18. This provides an effective seal for coolant coming from the work area 108. To further enhance this seal, a resilient seal material 17 can be provided between the overlapping portions of doors 16, 18. Door 16 includes three windows, made of high impact strength material, thru which an operator can observe the workpiece while the machine tool is operating.

Chip Conveyor—Conveyor Assembly

The chip conveyor assembly 36 transports metal chips or turnings from a location directly beneath the work area 108 to the discharge area 40. To this end, the chip conveyor assembly 36 includes a continuous conveyor 140 (see FIGS. 1, 3 and 4) which extends throughout the length of the chip conveyor assembly 36. The continuous conveyor 140 includes a large number of slats which are hingedly interconnected in a manner generally similar to that shown in U.S. Pat. No. 2,725,975 to form a flexible chain 144 (see FIG. 1).

The flexible chain 144 extends around a drive sprocket 146 which is driven in a clockwise direction (as viewed in FIG. 1) by a suitable drive motor (not shown). The drive sprocket 146 supports the flexible chain 144 to form one end of the conveyor 140. The other end of the conveyor 140 is formed by an idler sprocket 148. Suitable guide tracks (not shown) are provided to form a curve which extends from the junction between a straight longitudinally extending main section 150 of the conveyor assembly and a discharge section 152 which curves upwardly from the main section 150.

The chain conveyor 144 has an upper run 154 which extends parallel to the spindle axis 52. The upper run 154 includes a straight horizontal main section 156. The straight main section 156 extends beneath the work area 108 and has a longitudinal central axis which extends parallel to the spindle axis 52 (see FIG. 2). Therefore, chips or turnings which are formed in the work area 108 fall directly downwardly onto the upper run 154 of the main section 156 of the chain conveyor 144.

The upper run 154 of the chain conveyor 144 is disposed above the body 124 of coolant. Therefore, coolant cascades downwardly onto the upper run 154 and deposits chips on the upper run. The coolant then flows through openings in the chain conveyor 144 to the body of coolant 124 in the trough 120.

The upper run 154 has a discharge section 160 which slopes upwardly along suitable guide tracks and extends through a rectangular end opening 164 formed at the right (as viewed in FIG. 1) end of the machine tool 10. The slope of the discharge section 160 is such that turnings or chips on the section are carried to the discharge area 40. The chips then cascade off the conveyor chain 144 at the bend around the drive sprocket 146 and fall into a receptacle (not shown) at the discharge area 40.

Chip Conveyor Assembly—Movable

In accordance with a feature of the present invention, the chip conveyor assembly 36 is movable from the closed or operating position shown in solid and dashed lines in FIGS. 1 and 3 to an open position shown in phantom lines in FIGS. 3. When the chip conveyor assembly 36 is in the closed position shown in solid and dashed lines in FIGS. 1 and 3, the upper run 154 of the chip conveyor 140 is disposed directly beneath the work area 108. At this time, the housing 12 impedes operator access to the conveyor 140.

When the chip conveyor assembly 36 is in the open position shown in phantom lines in FIG. 3, the conveyor 140 is exposed to facilitate maintenance of the conveyor. The open position of the chip conveyor assembly 36 has been shown in FIG. 3 as being in front of and spaced a substantial distance from the machine tool 10. However, it is contemplated that the chip conveyor assembly 36 could be moved to an open position in which the chip conveyor would be closer to the machine tool. In fact, if desired, the chip conveyor assembly 36 could be moved to an open position in which a portion of the chip conveyor assembly is disposed beneath the housing 12.

Figure 4:
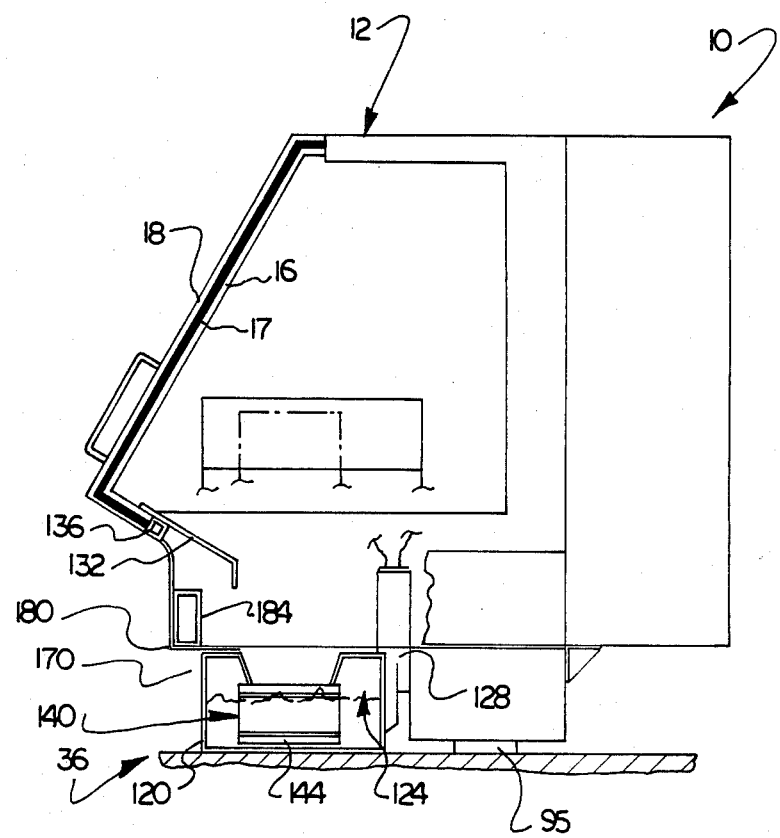
FIG. 4 is a fragmentary view, taken generally along the line 4—4 of FIG. 1, further illustrating the relationship between the chip conveyor assembly and the housing of the machine tool.

In moving from the closed position to the open position, the chip conveyor assembly 36 moves through a rectangular opening 170 (see FIGS. 1 and 4) in the front of the machine tool 10. The rectangular opening 170 is partially defined by the housing 12 and has a longitudinal central axis which extends parallel to the spindle axis 52 and the upper run 154 of the conveyor 140. The front opening 170 has a length which is approximately the same as the length of the bed section 42. The front opening 170 intersects the end opening 164 to form a combined opening having a generally L-shaped configuration. When the chip conveyor assembly 36 is in the closed or operating position of FIGS. 1, 3 and 4, the chip conveyor 140 extends through the end opening 164 (FIG. 1) and is disposed inwardly from the front opening 170 (FIG. 4).

When the chip conveyor assembly 36 is to be moved to an open position in which the upper run 154 of the conveyor 140 is exposed, the chip conveyor assembly 36 is pulled straight out through the opening 170 along a straight path extending perpendicular to the spindle axis 52 and the central axis of the upper run 154 of the conveyor 140. As the chip conveyor assembly 36 is pulled through the front opening 170, the chip conveyor assembly moves out of the end opening 164. As this occurs, a bottom surface 174 of the coolant tank 120 slides along a floor or other support surface. It is contemplated that suitable skids or other support will be provided to facilitate movement of the chip conveyor assembly 36 between the open and closed positions.

Since the coolant pump 128 and a motor (not shown) for driving the conveyor 140 are mounted on the tank 120, the entire chip conveyor assembly 36 moves between the open and closed positions. Suitable quick-disconnect couplings are provided to connect the coolant pump and motor assembly 128 with wires and conduits mounted on the base 41 of the machine tool 10. These quick-disconnect couplings are released before the chip conveyor assembly 36 is moved from the closed position to the open position.

Housing

The housing 12 overhangs and partially encloses the chip conveyor assembly 36 (see FIGS. 1 and 4). The housing 12 has a corner portion 180 which is supported only by the base 41 of the machine tool and is not held up by a support member extending downwardly from the corner to the floor. Opening 170 is entirely free of any obstruction which would prevent movement of the chip conveyor assembly 36 from the closed position through the opening to the open position.

Figure 5:
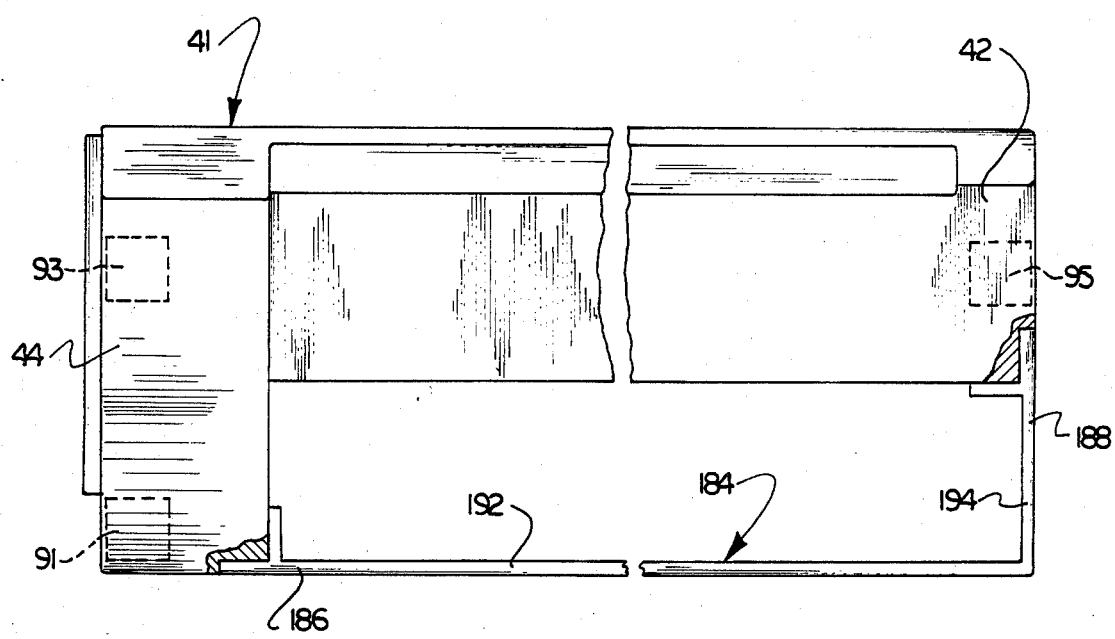
FIG. 5 is a top plan view, generally similar to FIG. 3, illustrating only a base for the machine tool and a frame member for supporting the housing.

To support the housing 12 in an overhanging relationship with the chip conveyor assembly 36, the housing includes a frame member 184 which is connected with the base 41 of the machine tool 10. The frame member 184 has a front end portion 186 which is fixedly connected with the headstock section 44 (FIG. 5). An opposite end portion 188 of the frame member 184 is connected with the bed section 42. The cantilevered mounting of the frame member 184 from the base 41 results in the front opening 170 and the end opening 164 being free of obstructions which would prevent the chip conveyor assembly 36 from being pulled outwardly through the front opening to the open position shown in phantom lines in FIG. 3.

The frame member 184 extends across the rectangular front opening 170 and the rectangular end opening 164. Thus, a main or front section 192 of the frame member 184 and the door 16 are directly above the opening 170 (see FIG. 4). A side section 194 of the frame member 184 is disposed directly above the end opening 164 (see FIG. 1).

When the chip conveyor assembly 36 is in the closed position of FIG. 1, the inner side of the trough 120 is disposed in abutting engagement with the bed section 42 (FIG. 5) of the base 41. The left (as viewed in FIG. 1) end of the chip conveyor assembly 36 is disposed in abutting engagement with the head section 44 of the base 41. At this time, the outer side surface of the trough 120 is disposed slightly inwardly of the main section 192 of the frame member 184 (see FIG. 4). However, the end section 194 of the frame member 184 extends across the trough 120.

Chip conveyor assembly 36 is self-supporting and free standing. Chip conveyor assembly 36 is connected to base 41 only thru flexible fluid or electrical connections. Base 41 does not support chip conveyor assembly 36 and derives no support from chip conveyor assembly 36. Base 41 is supported by only three pads 91, 93, 95. Members cantilevered from base 41 provides support for all electrical hydraulic controls and drives associated with machine tool 10. Thus, except for the chip conveyor assembly 36, machine tool 10 and all associated controls and drives are supported thru the three pads 91, 93, 95.

Summary

In view of the foregoing, it is apparent the present invention provides a machine tool 10 having a chip conveyor 36 which is movable from an operating or closed position (FIGS. 1 and 3) directly beneath a work area 108 of the machine tool through an opening 170 in the front of the machine tool. By moving the chip conveyor assembly 36 through an opening 170 in the front of the machine tool rather an end of the machine tool, the amount of floor space required at the end of the machine tool tends to be minimized and withdrawal of the chip conveyor from the machine tool for maintenance purposes is facilitated. The floor space required by the chip conveyor assembly 36 at the front of the machine tool 10 is not wasted since this space must be provided for an operator of the machine.

The chip conveyor assembly 36 includes a conveyor 140 having an upper run 154 which extends parallel to the spindle axis 52. The portion of the upper run 154 adjacent to the headstock 44 is disposed directly beneath the spindle axis 52 and the work area 108 when the chip conveyor assembly 36 is in the closed position. At this time, the discharge section 160 of the upper run 154 extends through the end opening 164. Upon movement of the chip conveyor assembly 36 toward the open position (shown in phantom lines in FIG. 3), the main section 156 of the upper run 154 moves through the front opening 170 and the discharge section 160 moves out of the end opening 164. When the chip conveyor assembly reaches the open position (shown in phantom lines in FIG. 3), the upper run 154 is disposed in front of the machine tool.

Having described one specific preferred embodiment of the invention, the following is claimed:

1. A machine tool comprising an elongated base having first and second ends, spindle means connected with said base adjacent to said first end of said base for rotating a workpiece about a spindle axis with a portion of the workpiece disposed in a work area which is accessible to an operator disposed in front of the machine tool, said spindle axis extending perpendicular to vertical planes which at least partially contain the first and second ends of said base, tool support means for supporting a tool to cut material from the portion of the workpiece in the work area as the workpiece is rotated about the spindle axis by said spindle means, means for directing a flow of coolant to the work area, control means disposed at the front of the machine tool and actuatable by an operator to at least partially control operation of the machine tool, a housing which at least partially encloses the work area and the second end of said base, said housing having a plurality of corner portions, said housing including means for at least partially defining an elongated front opening disposed beneath the work area and extending from a location adjacent to said spindle means to the second end of said base, said elongated front opening having a longitudinal upper edge portion which extends to the second end of said base and is generally parallel to the spindle axis, said housing further including means for at least partially defining an end opening at the second end of said base, said end opening being disposed in a plane extending transversely to a plane containing said front opening, said front and end openings intersecting beneath one of the corner portions of said housing, said one corner portion of said housing being free of downwardly extending supports, and chip conveyor means for conveying pieces of material cut from the workpiece past the second end of said base and through the end opening to a discharge area located outside of said housing, said chip conveyor means including an elongated coolant tank for receiving coolant from the work area and a conveyor assembly at least partially disposed in said coolant tank and having an elongated upper run extending generally parallel to the longitudinal upper edge portion of said front opening, said coolant tank having a longitudinally extending upper edge portion which extends generally parallel to and has substantially the same length as the longitudinal upper edge portion of said front opening, said conveyor assembly having an outlet end portion connected with said upper run for conducting material cut from a workpiece away from the end opening to the discharge area, said chip conveyor means being movable through the front and end openings along a straight path extending transversely to the spindle axis between a closed position and an open position, said upper run of said conveyor assembly and said coolant tank being at least partially disposed within said housing beneath the work area and said outlet end portion of said conveyor assembly and said coolant tank projecting outwardly through the end opening past said second end of said base when said chip conveyor means is in the closed position, said upper run of said conveyor assembly and said coolant tank being at least partially disposed in front of the machine tool when said chip conveyor means is in the open position.

2. A machine tool as set forth in claim 1 wherein said housing includes a door which is movable between a first position blocking access to the work area and a second position in which the work area is accessible to an operator disposed in front of the machine tool, said front opening being at least partially disposed beneath said door.

3. A machine tool as set forth in claim 1 wherein said base include a head end portion and a bed portion which extends longitudinally outwardly from said head end portion, said front opening extending from said head end portion in the same direction as said bed portion and having a length which is at least substanially as great as the length of said bed portion.

4. A machine tool as set forth in claim 1 wherein said housing includes a plurality of slidable doors and track means extending parallel to the spindle axis for supporting said slidable doors for movement along a path extending parallel to the spindle axis between a closed condition in which the work area is partially enclosed by said slidable doors and an open condition in which the work area is accessible to an operator of the machine tool, said track means being disposed above said front opening, said slidable doors having edge portions which overlap to a relatively small extent in a direction parallel to said track means when said slidable doors are in the closed codition, said slidable doors overlapping to a relatively large extent in a direction parallel to said track means when said slidable doors are in the open condition, a first one of said plurality of slidable doors being disposed on said track means adjacent to said spindle means and a second one of said plurality of slidable doors being disposed on said track means and being spaced further from said spindle means than said first slidable door when said slidable doors are in the closed condition, said first slidable door being disposed in an overlapping relationship with the second slidable door and being disposed on a side of said second slidable door toward the spindle axis when said slidable doors are in the open condition, and deflector means connected to said first slidable door and movable therewith as said first slidable door moves between the open and closed conditions for directing coolant and material cut from the workpiece downwardly and inwardly toward a portion of said chip conveyor assembly when said first slidable door is in the closed condition and chip conveyor assembly is in the closed postion, said deflector means extending inwardly from a first side of said first slidable door toward said chip conveyor assembly, said second slidable door being disposed on a second side of said first slidable door opposite from said deflector means when said first and second slidable doors are in the open condition and overlapping said first slidable door on the second side of said first slidable door when said first and second slidable doors are in the closed condition.

* * * * *